Jan. 12, 1954
E. H. SCHWENCKE
2,666,036
METHODS OF PRODUCING A CELLULAR STRUCTURE
IN A PLASTICIZED VINYL ESTER RESIN
Filed Nov. 2, 1953
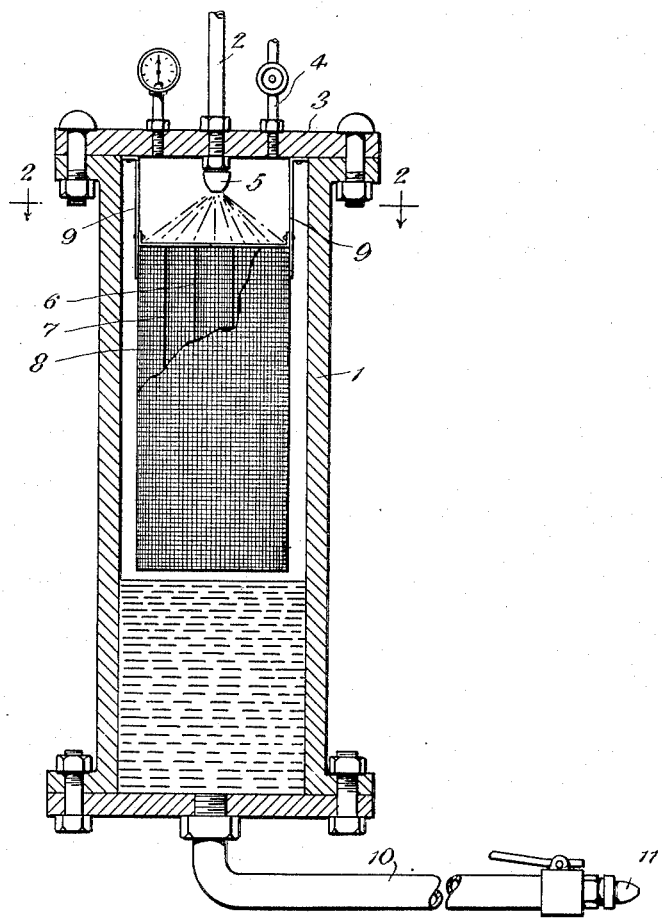
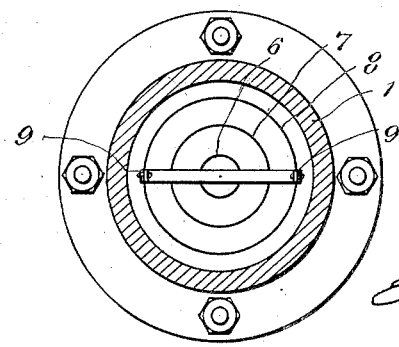
INVENTOR.
Edmund H. Schwencke
BY
ATTORNEYS Patented Jan. 12, 1954

2,666,036

UNITED STATES PATENT OFFICE 2,666,036

METHODS OF PRODUCING A CELLULAR STRUCTURE IN A PLASTICIZED VINYL ESTER RESIN

Edmund H. Schwencke, New York, N. Y., assignor to Elastomer Chemical Corporation, Newark, N. J., a corporation of New Jersey Application November 2, 1953, Serial No. 389,678

9 Claims. (Cl. 260—2.5)

This invention relates to methods of producing a cellular structure in an uncured plasticized vinyl ester resin which may be used to produce a final cured product having a cellular structure similar in some respects to that of the cellular rubber products which are popularly known as "sponge rubber" or "foam rubber," but having certain advantages thereover.

This application is a continuation in part of my prior applications Serial No. 102,712, filed July 1, 1949; Serial No. 265,535, filed January 8, 1952; and Serial No. 286,524, filed May 7, 1952, all of which applications are now abandoned.

It is an object of the present invention to provide methods of producing a plasticized, uncured vinyl ester resin having a cellular structure therein, which said resin is in a free-flowing fluid state which may be poured into molds or spread onto surfaces for subsequent curing and which will retain its cellular structure while being poured or spread, and subsequently while being cured.

Other objects and advantages of the invention will appear hereinafter.

A preferred embodiment of apparatus suitable for carrying out the method of the invention is shown in the accompanying drawings, in which, Figure 1 is a vertical section through a container, and Figure 2 is a section on the line 2—2 of Figure 1.

According to the present invention, I combine with the resin a sufficient quantity of plasticizer to provide a free-flowing fluid mix. Preferably, I also combine with the resin a small quantity of a water insoluble metallic salt of a fatty acid containing from 12 to 22 carbon atoms in the molecule.

This plasticized resin is then placed in a closed container having mechanical strength sufficient to withstand pressures of 1000 lbs. per sq. in. or more. Preferably the capacity of the container should be at least twice the volume of the resin contained therein. While in the container, the plasticized resin is subjected to an inert gas such as carbon dioxide, nitrous oxide, helium or mixtures thereof which have no chemical affinity for the resin and do not react therewith. The gas is maintained at a pressure between 100 and 800 lbs. per sq. in., and at these pressures it appears that the gas is absorbed into the resin. In general, the higher the pressure of the gas, the more rapid and thorough the absorption, the finer the cellular structure, and the lower the density of the product will be. Pressures of 300 to 500 lbs. per sq. in. are preferred, therefore.

During the treatment of the resin with the gas, it is important to provide large surface areas which are exposed to the gas, and it is desirable to provide for movement of the resin within the container so as to repeatedly expose new surface areas to the gas. For example, the gas may be introduced through the bottom of the container so that the gas bubbles up through the resin. When introduced in this manner, little or no additional agitation is required to insure a thorough dispersion and absorption of gas throughout the resin. If the gas is introduced at the top of the container above the level of the contents, the contents should be agitated to insure dispersion. This may be done by stirring the contents with suitable rotatable members or by turning the container end over end, or in any other manner capable of exposing fresh surfaces of the resin to the gas.

One manner which I have found very simple and convenient is illustrated in the drawings in which the container 1 is provided with an inlet pipe 2 entering the container through the top plate 3, through which plasticized resin may be introduced into the container. Gas may be admitted to the container through pipe 4 which may be connected to any suitable source of gas such as the ordinary gas cylinders containing liquified gas at very high pressures.

The resin is pumped into the container through the pipe 2 and is discharged through a nozzle 5 which distributes the resin onto surfaces adapted to expose large areas of the resin to the gas. In the preferred embodiment illustrated, these comprise a series of foraminous screens 6, 7 and 8 of cylindrical shape arranged concentrically. Said screens may be suspended from the top plate 3 by straps 9. The resin discharged onto said screens flows slowly downwardly in relatively thin layers, both surfaces of which are constantly changing and constantly exposed to the gas in the container. The resin drips from the bottom edges of the screens and is collected in the bottom of the tank from which it may flow through the flexible pipe 10 to the discharge nozzle 11.

The method of the invention may be carried out either as a batch or as a continuous process. For a batch process, the desired quantity of resin may be introduced into the container and the container may then be sealed. Thereafter gas is introduced until the pressure in the container reaches the desired level, after which the contents are preferably agitated as previously described. Thereafter the resin is discharged, under pressure, through a suitable nozzle. The resin should be discharged at a temperature below its gelling temperature so that it issues in ungelled state in the form of an expanded, creamy foam. If the resins are kept at temperatures below 90° F., it is extremely unlikely that gelling will occur.

For a continuous process, the inlet pipe 2 is connected to a pump capable of delivering plasticized resin to the container while the desired pressure is maintained therein. Any suitable type of positive pressure pump may be used for this purpose, but I prefer to use a helical gear pump of the type disclosed in U. S. Patent No. 2,028,407, dated January 21, 1936, for such pumps can deliver high pressures without heating the resins unduly while passing through the pump. Gas is admitted through pipe 4 and a suitable pressure regulator may be employed to maintain a uniform gas pressure within the container. The combined effect of the discharge of the resin through the nozzle 5 and the slow movement of the resin along the screens is sufficient to permit the desired absorption of gas.

Ordinarily the rate of delivery of foam through the nozzle will be substantially uniform and the rate of delivery of resin to the container will also be uniform. In cases where it may be desired to interrupt delivery of foam from time to time, however, provision should be made to simultaneously interrupt delivery of resin to the container, as by a switch in the line of the pump motor which is controlled by operation of the nozzle valve.

In either the batch or continuous process, the foam issuing from the nozzle may be directed into a mold if it is desired to form a molded product, or it may be spread in a layer on a surface. The discharged foam will remain stable for an hour or more if not disturbed mechanically.

As previously stated, the foam may be cured at relatively low temperatures, excellent results being obtained at temperatures between 220° and 230° F. At these temperatures a curing period of five minutes per 1/8" thickness of the product has been found adequate.

The final cured product has a density and a cellular structure which is largely dependent on the gas pressure employed and the thoroughness of the absorption of the gas. Low pressures or insufficient absorption result in a heavy product with a rather coarse cellular structure. Higher pressures and good absorption result in a lighter product having a finer cellular structure. In all cases, the product is extremely elastic and resilient, is non-inflammable and resists deterioration when subjected to hydrocarbon oils, acids and alkalis.

The method described herein is applicable to polyvinyl chloride and to copolymers of vinyl chloride and vinyl acetate.

Such resins may be plasticized by ester type plasticizers such as phosphates, phthalates, adipates, sebacates, azaleates, glycollates, etc. or they may be plasticized in the manner described in my prior U. S. Patent No. 2,515,382 by a hydrocarbon oil of a type known and available commercially under the trade name Sovaloid C. This oil, a product of Socony Vacuum Oil Company is at least 90% aromatic and is characterized by the predominance of three and four ringed molecules containing two to four short alkyl side chains. It has a specific gravity greater than one, a mixed aniline point critical solution temperature between 65°–70° F. and a boiling range between approximately 580°–760° F.

The water insoluble salt of a fatty acid containing 12 to 22 carbon atoms in the molecule is combined with the plasticizer in proportions varying from a maximum of one part fatty acid salt to fifty parts plasticizer to a minimum of one part fatty acid to two hundred parts plasticizer. In the case of ester type plasticizers the permissible proportions are somewhat more restricted than in the case of the aromatic hydrocarbon plasticizer and vary from a maximum of one part fatty acid salt to seventy five parts plasticizer to a minimum of one part fatty acid salt to one hundred and twenty-five parts plasticizer.

As a fatty acid salt, I prefer to use aluminum stearate having a free fatty acid content of from 7.5% to 10%, using approximately one part stearate to one hundred parts plasticizer.[1]

In combining the fatty acid salt with the plasticizer, it is important to note that the fatty acid salt must be melted into the plasticizer and not merely dispersed therein. Preferably, in combining the fatty acid salt with the plasticizer, the fatty acid salt is first melted into a small quantity of the plasticizer, in proportions, for example, of one part fatty acid salt to from five to fifteen parts plasticizer, and then the remaining plasticizer is added subsequently. In the case of ester type plasticizers, it is desirable to melt the fatty acid salt into a small quantity of an organic ester type plasticizer such as dioctyl phthalate, for example, and then to add a larger quantity of an inorganic ester type plasticizer such as tricresyl phosphate, for example.

In melting the fatty acid salt into the plasticizer, the two are mixed and heated slowly to approximately 230° F. while stirring constantly, and are held at that temperature until the fatty acid salt is completely melted, as indicated by the fact that the mixture becomes clear and transparent. The mixture is then allowed to cool to room temperature when it will be found to be in the form of a rather heavy gel. This gel may then be mixed with the additional plasticizer, and thereafter the plasticizer with the incorporated fatty acid salt may be mixed with the vinyl resin. In the case of ester type plasticizers, proportions varying from one part plasticizer to one part resin to one and three-quarter parts plasticizer to one part resin will provide a free-flowing fluid mixture suitable for foaming in accordance with the method of the present invention. In the case of aromatic hydrocarbon plasticizers, proportions varying from one part plasticizer to one part resin to two and one-half parts plasticizer to one part resin will provide a free-flowing fluid mixture suitable for foaming in accordance with the method of the present invention.

*Example I*

| | Parts |
|---|---|
| Aluminum stearate (free fatty acid content 7.5 to 10%) | 2 |
| Sovaloid C (or equivalent aromatic hydrocarbon) | 200 |
| Resin (85% polyvinyl chloride and 15% polyvinyl acetate) | 100 |

The aluminum stearate is first dispersed in

---

[1] Several grades of aluminum stearate are available having different contents of free fatty acid. If the free fatty acid content is above 10% a higher proportion of stearate should be used; if lower than 7.5% a lower proportion may be used.

twenty parts of Sovaloid C and the mixture is heated slowly to 230° F. while stirring constantly. At this temperature the stearate melts and blends thoroughly with the plasticizer, and if the mixture is held at this temperature for a period of ten to fifteen minutes, thorough blending is assured. The mixture is then allowed to cool to room temperature. While cooling a gel structure develops in the mixture and at room temperature the mixture takes the form of a heavy gel. This gel is then mixed with 180 parts of Sovaloid C and the resulting mixture is then combined with the resin. Any suitable kind of mixing or milling equipment may be used for these mixing operations. The resulting product will be a creamy, free-flowing liquid which is readily pourable. In the batch process, this mixture is then placed in a closed container as previously described and carbon dioxide is introduced under pressure until the pressure in the container reaches approximately 100 to 800 lbs. per sq. in., depending on the properties desired. The contents of the container may now be agitated as by turning the container end over end, while always maintaining the material at a temperature below gelling temperature. Thereafter the resin may be discharged through a suitable nozzle from which it issues in ungelled state in the form of an expanded, creamy foam which is stable.

In the continuous process the mixture is pumped continuously into the container in which the desired gas pressure and the desired temperature is maintained. After a sufficient amount has been accumulated in the bottom of the container after draining over the screen surfaces, foam may be discharged continuously or intermittently through the discharge nozzle.

*Example II*

| | Parts |
|---|---|
| Aluminum stearate (free fatty acid content 7.5 to 10%) | 1.5 |
| Dioctyl phthalate | 12 |
| Tri-cresyl phosphate | 138 |
| Resin (85% polyvinyl chloride and 15% polyvinyl acetate) | 100 |

The aluminum stearate is first dispersed in the dioctyl phthlate and the mixture is then heated slowly to a temperature of approximately 230° F. while stirring constantly. At this temperature the stearate melts and blends thoroughly with the plasticizer, and if the mixture is held at this temperature for a period of ten to fifteen minutes, thorough blending is assured. The mixture is then allowed to cool to room temperature. While cooling a gel structure develops in the mixture and at room temperature the mixture takes the form of a heavy gel. This gel is then mixed with the tri-cresyl phosphate and the resulting mixture is then combined with the resin. Any suitable kind of mixing or milling equipment may be used for these mixing operations. The resulting product will be a creamy, free-flowing liquid which is readily pourable. In the batch process, this mixture is then placed in a closed container as previously described and nitrous oxide or carbon dioxide is introduced under pressure until the pressure in the container reaches approximately 100 to 800 lbs. per sq. in., depending on the properties desired. The contents of the container may now be agitated as by turning the container end over end, while always maintaining the material at a temperature below gelling temperature. Thereafter the resin may be discharged through a suitable nozzle from which it issues in ungelled state in the form of an expanded, creamy foam which is stable.

In the continuous process the mixture is pumped continuously into the container in which the desired gas pressure and the desired temperature is maintained. After a sufficient amount has been accumulated in the bottom of the container after draining over the screen surfaces, foam may be discharged continuously or intermittently through the discharge nozzle.

It will be understood that the invention may be variously modified and embodied within the scope of the subjoined claims.

I claim as my invention:

1. The method of producing a cellular structure in a polymerized material from the group consisting of polyvinyl chloride and copolymers of vinyl chloride and vinyl acetate dispersed in sufficient plasticizer to provide a free flowing mass, which comprises dispersing an inert gas throughout such a free flowing mass in a closed container while maintaining within said container a pressure exceeding 100 lbs. per sq. in., and discharging said mass from said container under the influence of the pressure maintained in said container and at a temperature below the gelling temperature of said mass, said mass being discharged in ungelled state in the form of an expanded, creamy foam.

2. The method of producing a cellular structure in a polymerized material from the group consisting of polyvinyl chloride and copolymers of vinyl chloride and vinyl acetate, which comprises melting a water insoluble metallic salt of a fatty acid containing from 12 to 22 carbon atoms in the molecule into a plasticizer, mixing the plasticizer and fatty acid salt with the resin in proportions sufficient to provide a free-flowing, fluid mixture, dispersing an inert gas throughout said mixture in a closed container while maintaining within said contaner a pressure exceedng 100 lbs. per sq. in., and discharging said mixture from said container under the influence of the pressure maintained in said container and at a temperature below the gelling temperature of the mixture, said mass being discharged in ungelled state in the form of an expanded, creamy foam.

3. The method claimed in claim 2 in which the proportion of fatty acid salt to plasticizer varies from a maximum of one part fatty acid salt to fifty parts plasticizer to a minimum of one part fatty acid salt to two hundred parts plasticizer.

4. The method claimed in claim 2 in which the fatty acid salt is aluminum stearate.

5. The method claimed in claim 2 in which the fatty acid salt is aluminum stearate and one part of stearate is combined with from fifty to two hundred parts of plasticizer.

6. The method claimed in claim 2 in which the fatty acid salt is melted into the plasticizer by dispersing it in a small quantity of the plasticizer, then heating said plasticizer slowly to a temperature of 230° F., maintaining the plasticizer at this temperature until the salt is melted, then cooling the mixture to room temperature, and then adding additional plasticizer.

7. The method of producing a cellular structure in a polymerized material from the group consisting of polyvinyl chloride and copolymers of vinyl chloride and vinyl acetate dispersed in sufficient plasticizer to provide a free flowing mass, which comprises discharging such resin into a closed container in which an atmosphere of inert gas is maintained at a pressure exceeding 100 lbs. per sq. in., flowing thin layers of said resin along extended surfaces within said container, and discharging the resin from said container under the influence of the pressure maintained in said container and at a temperature below the gelling temperature of said resin, said resin being discharged in ungelled state in the form of an expanded, creamy foam.

8. The method claimed in claim 7 in which said resin is discharged continuously into said container and is discharged continuously from said container.

9. The method of producing a cellular structure in a polymerized material from the group consisting of polyvinyl chloride and copolymers of vinyl chloride and vinyl acetate, which comprises mixing a plasticizer with the resin in proportions sufficient to form a free flowing, fluid mixture which is readily pourable, introducing said mixture into a closed container, dispersing an inert gas throughout said mixture by subjecting the mixture to a gas pressure exceeding 100 lbs. per sq. in., and discharging said mixture from said container under the influence of the gas pressure maintained in said container, said mixture being discharged in ungelled state in the form of an expanded, creamy foam.

EDMUND H. SCHWENCKE.

References Cited in the file of this patent

UNITED STATES PATENTS

| Number | Name | Date |
|---|---|---|
| 2,020,994 | Chapman | Nov. 12, 1935 |
| 2,342,526 | Borton | Feb. 22, 1944 |
| 2,484,397 | Barton | Oct. 11, 1949 |
| 2,525,880 | Feldman | Oct. 17, 1950 |
| 2,549,864 | Toulmin | Apr. 24, 1951 |
| 2,567,950 | Stauffer | Sept. 18, 1951 |
| 2,567,952 | Lewis | Sept. 18, 1951 |

FOREIGN PATENTS

| Number | Country | Date |
|---|---|---|
| 500,298 | Great Britain | Feb. 7, 1939 |

OTHER REFERENCES

Elements of Chem. Eng., Badger and McCabe, copyright 1936, page 376.